United States Patent
Yamamoto et al.

(10) Patent No.: US 7,297,728 B2
(45) Date of Patent: Nov. 20, 2007

(54) FRICTION MATERIAL

(75) Inventors: Kazuhide Yamamoto, Gunma-ken (JP); Yasuki Hattori, Gunma-ken (JP)

(73) Assignee: Nisshinbo, Industries, Inc., Tokyo (JP)

( * ) Notice: Subject to any disclaimer, the term of this patent is extended or adjusted under 35 U.S.C. 154(b) by 323 days.

(21) Appl. No.: 10/880,548

(22) Filed: Jul. 1, 2004

(65) Prior Publication Data
US 2005/0004258 A1 Jan. 6, 2005

(30) Foreign Application Priority Data
Jul. 2, 2003 (JP) .............................. 2003-190068

(51) Int. Cl.
*C08J 5/14* (2006.01)
(52) U.S. Cl. .................. 523/149; 523/152; 523/153; 523/155; 523/156; 523/157; 523/158
(58) Field of Classification Search ................ 523/149, 523/155, 152, 153, 156, 157, 158
See application file for complete search history.

(56) References Cited

U.S. PATENT DOCUMENTS

| | | | | |
|---|---|---|---|---|
| 3,267,048 | A * | 8/1966 | Horste et al. ................ | 521/181 |
| 4,085,179 | A * | 4/1978 | Hillhouse et al. ............ | 264/122 |
| 6,451,872 | B1 * | 9/2002 | Yamane ....................... | 523/156 |
| 2002/0137815 | A1 * | 9/2002 | Takeuchi et al. ............. | 523/152 |
| 2004/0242432 | A1 * | 12/2004 | Suzuki et al. ................ | 508/100 |

FOREIGN PATENT DOCUMENTS

| | | | |
|---|---|---|---|
| EP | 1179687 A1 | * | 2/2002 |
| JP | 59074180 A | * | 4/1984 |
| JP | 61261387 A | * | 11/1986 |
| JP | 62015281 A | * | 1/1987 |
| JP | 1-320329 A | | 12/1989 |
| JP | 05032956 A | * | 2/1993 |
| JP | 8-135703 A | | 5/1996 |

OTHER PUBLICATIONS

Kutz, Myer (1998). Mechanical Engineers' Handbook (2nd Edition). (pp. 172-176). John Wiley & Sons.*
Smith, Edward H. (1998). Mechanical Engineer's Reference Book (12th Edition). (pp. 7/35-7/40). Elsevier.*
Translations for JP 59074180, JP 61261387, and JP 62015281.*
JPO computer translation for JP 05-032956, Sep. 2, 1993.*

* cited by examiner

*Primary Examiner*—Edward J. Cain
(74) *Attorney, Agent, or Firm*—Birch, Stewart, Kolasch & Birch, LLP

(57) ABSTRACT

A friction material is made by molding and curing a composition containing a fibrous base that includes stainless steel fibers but not other steel fibers, a binder, and a friction modifier that includes at least two types of hard particles having a large Mohs hardness, bronze powder and a specific amount of tin sulfide. The friction material has a excellent balance of properties, including a high strain linearity that provides a excellent brake feel, a high torque linearity and a excellent effectiveness, and also minimizes disc rotor attack, disc pad wear and metal pickup. Such friction materials are particularly suitable for automotive applications, such as disc pads.

4 Claims, No Drawings

FRICTION MATERIAL

This Nonprovisional application claims priority under 35 U.S.C. § 119(a) on patent application Ser. No(s). 2003-190068 filed in Japan on Jul. 2, 2003, the entire contents of which are hereby incorporated by reference.

BACKGROUND OF THE INVENTION

1. Field of the Invention

The present invention relates to friction materials suitable for use in such applications as brake pads and brake linings for automobiles and various types of industrial machinery.

2. Prior Art

Friction materials such as disk brake pads and brake linings, particularly those used in vehicles such as automobiles and motorcycles, are required to have not only a sufficiently high coefficient of friction (good effectiveness), but also various other properties. For the intentions of the driver to be accurately manifested as a braking force on the vehicle, a quality referred to hereinafter as "excellent brake feel," it is essential that the friction material undergo little elastic deformation when subjected to stress and that the coefficient of friction have a linear relationship with the stress (i.e., that the strain incurred be linear). Further requirements include low fluctuation in the friction coefficient (a linear torque) even when the opposing material such as a disc rotor or brake drum is turning at high speed or is at a high temperature, little tendency to damage the disc rotor (low disc rotor attack), resistance of the friction material to wear, and little tendency for metal components from the abraded rotor to aggregate on the surface of the friction material and cause abnormal wear of the disc rotor (low metal pickup). The desire has been to achieve these and other required properties in a good balance.

Of these various required properties, to ensure in particular a high friction coefficient under high loading, JP-A 8-135703 discloses a friction material for stainless steel rotors which is composed of a fibrous base, a resin binder and a filler, and which includes as metal components 30 to 60 wt % of at least one type of copper-based fiber selected from among copper fibers and brass fibers and 3 to 10 wt % of stainless steel fibers or powder, and additionally includes 2 to 10 wt % of graphite. All of these amounts are based on the overall friction material.

Also, particularly to obtain a friction material having a linear torque (that is, to prevent a decrease in the coefficient of friction under the application of a high hydraulic pressure), JP-A 1-320329 discloses a friction material composition which is prepared by blending reinforcing fibrous materials, specifically 5 to 15% of steel fibers or stainless steel fibers, and also ceramic fibers and organic resin fibers, with organic fillers, inorganic fillers, metal powders and friction modifiers, and binding these components with a thermoset resin binder, and which additionally contains 0.1 to 2.0 vol % of an alloy powder having a microvickers hardness of at least 1,000.

However, friction materials endowed with all of the various above properties required of friction materials for disc brake pads, particularly those used in vehicles such as automobiles, have not hitherto been developed. Hence, there is a need for friction materials which achieve a good balance of these required properties.

SUMMARY OF THE INVENTION

It is therefore an object of the invention to provide a friction material in which the amount of strain with respect to the hydraulic line pressure is linear and which thus confers a excellent brake feel, in which the torque developed in response to the pushing force at high speed and at high temperature is linear, which has a good effectiveness, which minimizes disc rotor attack, disc pad wear and metal pickup, and moreover in which all of these properties exist in a good balance.

The inventors have found that friction materials which are made by molding and curing a composition containing a fibrous base, a friction modifier and a binder, and in which the fibrous base includes stainless steel fibers but is free of other steel fibers and the friction modifier includes at least two types of hard particles having a Mohs hardness of at least 9, bronze powder and 3.5 to 7.5 wt % of tin sulfide, based on the overall composition, are able to achieve a good balance in the various properties required of friction materials for disc brake pads, particularly those used in automobiles and other vehicles.

Accordingly, the invention provides a friction material made by molding and curing a composition containing a fibrous base, a friction modifier and a binder, wherein the fibrous base includes stainless steel fibers but is free of other steel fibers and the friction modifier includes at least two types of hard particles having a Mohs hardness of at least 9, bronze powder and 3.5 to 7.5 vol % of tin sulfide, based on the overall composition.

The friction material is typically free of copper fibers and copper powder. The hard particles having a Mohs hardness of at least 9 preferably include silicon carbide and alumina.

DETAILED DESCRIPTION OF THE INVENTION

The friction material of the invention is made by molding and curing a composition containing a fibrous base, a friction modifier and a binder.

Fibrous bases that may be used in the invention include metal fibers, inorganic fibers and organic fibers commonly used in friction materials. Illustrative examples of suitable fibrous bases include metal fibers such as stainless steel fiber and aluminum fiber; inorganic fibers such as ceramic fibers, potassium titanate fibers, glass fibers, rock wool, wollastonite, sepiolite, and synthetic mineral fibers; and organic fibers such as carbon fibers, aramid fibers, aramid pulp, polyimide fibers and polyamide especially preferred. Illustrative examples of such binders include phenolic resins, phenol aralkyl resins, various rubber-modified phenolic resins such as high-ortho phenolic resins modified with acrylonitrile-butadiene rubber (NBR), NBR-modified phenolic resins, acrylic rubber-modified phenolic resins and aromatically modified phenolic resins, and also melamine resins, epoxy resins, NBR, nitrile rubber and acrylic rubber. Any one or combinations of two or more of these may be used.

The amount of binder included in the friction material composition of the invention, while not subject to any particular limitation, is generally at least 9 vol %, and preferably at least 11 vol %, but generally not more than 20 vol %, and preferably not more than 15 vol %, based on the overall composition.

Friction modifiers that may be used in the present invention include metal friction modifiers, inorganic friction modifiers and organic friction modifiers commonly used in friction materials. To achieve a friction material which undergoes an amount of strain that is linear with respect to the hydraulic line pressure and thus provides a excellent brake feel, in which the torque developed in response to pushing forces at high speed and high temperature is linear, and which also has a good effectiveness, minimizes disc rotor attack, disc pad wear and metal pickup, a friction modifier which includes at least two types of hard particles having a Mohs hardness of at least 9, bronze powder and tin sulfide is used. The friction modifier used in the invention has a shape or form which, while not subject to any particular limitation, is preferably spherical, granular or powdery. Friction modifier in other forms, such as those composed of football-shaped, tabular or irregular shaped particles, may also be used, so long as the objects of the invention are attainable.

Illustrative examples of metal friction modifiers include metal powders such as iron, bronze, aluminum and stainless steel. These may be used singly or in combinations of two or more thereof. As noted above, the friction modifier in the invention includes a bronze powder. Moreover, in the invention, it is preferable to not use copper fibers or copper powder. Copper fibers and copper powder have a certain degree of hardness, which may result in an effectiveness that is excessive.

The metal powder has an average particle size of generally at least 40 μm, and preferably at least 60 μm, but generally not more than 120 μm, and preferably not more than 100 μm. "Average particle size," as used herein, refers to the 50% mean particle diameter measured using a laser diffraction-type particle size distribution analyzer.

The amount of metal friction modifier in the friction material composition, while not subject to any particular limitation, is generally at least 3.5 vol %, and preferably at least 4.5 vol %, but generally not more than 7.5 vol %, and preferably not more than 6.5 vol %, based on the overall composition.

Illustrative examples of inorganic friction modifiers include calcium carbonate, barium sulfate, magnesium oxide, graphite, calcium hydroxide, zirconium silicate, iron oxide, mica, zirconium oxide, quartz, alumina, silicon carbide, vermiculite, slaked lime, coke, graphite, tin sulfide and molybdenum disulfide. These may be used singly or as combinations of two or more thereof. As noted above, the friction modifier in the invention includes at least two types of hard particles having a Mohs hardness of at least 9, and tin sulfide.

Illustrative examples of the hard particles having a Mohs hardness of at least 9 include silicon carbide, alumina, titanium carbide, tungsten carbide, boron carbide, silicon nitride and boron nitride. Of these, the combined use of silicon carbide and alumina is preferred. When only silicon carbide is included, sufficiently low levels of disc rotor attack, disc pad wear and metal pickup may not be achieved. On the other hand, when only alumina is included, the torque fibers. These fibrous bases may be used singly or as combinations of two or more thereof. To achieve a friction material which undergoes an amount of strain that is linear with respect to the hydraulic line pressure and thus provides a excellent brake feel, and in which the torque developed in response to a pushing force at high speed and high temperature is linear, the friction material composition must include stainless steel fibers but be free of other steel fibers. Were the friction material to contain steel fibers but no stainless steel fibers, the linearity of the torque developed in response to the pushing force at high speed and high temperature would decrease.

The shape of the stainless steel fibers is not subject to any particular limitation. Stainless steel fibers of any shape, including short fibers and long fibers, may be used, although the use of short stainless steel fibers is preferred.

The stainless steel fibers have an average diameter of generally at least 24 μm, and preferably at least 40 μm, but generally not more than 75 μm, and preferably not more than 60 μm.

The stainless steel fibers have a length of generally at least 0.5 mm, and preferably at least 0.7 mm, but generally not more than 1.5 mm, and preferably not more than 1.3 mm. The fiber diameter and length are each obtained as the average of 50 measurements under an optical microscope.

No particular limitation is imposed on the amount of stainless steel fiber included in the friction material composition of the invention, although the amount based on the overall composition is generally at least 5 vol %, and preferably at least 7 vol %, but generally not more than 14 vol %, and preferably not more than 12 vol %. Too much stainless steel fiber may increase disc rotor attack, whereas too little may lower the linearity of friction material strain with respect to the hydraulic line pressure.

The binder may be any known binder commonly used in friction materials, although a thermoset resin binder is developed in response to a pushing force at high speed and high temperature may have poor linearity so that good effectiveness is not achieved.

The hard particles having a Mohs hardness of at least 9 are preferably in the form of a milled powder having sharp angles.

When silicon carbide is used as the hard particles having a Mohs hardness of at least 9, it has an average particle size of generally at least 2 μm, and preferably at least 3 μm, but generally not more than 6 μm, and preferably not more than 5 μm. If the silicon carbide has too large an average particle size, disc rotor attack may not be sufficiently low. On the other hand, if it has too small an average particle size, the torque linearity and effectiveness of the friction material may be compromised.

The silicon carbide content, based on the overall friction material composition, is generally at least 1 vol %, and preferably at least 1.5 vol %, but generally not more than 3 vol %, and preferably not more than 2.5 vol %.

When alumina is used as the hard particles having a Mohs hardness of at least 9, it has an average particle size of generally at least 7 μm, and preferably at least 8 μm, but generally not more than 13 μm, and preferably not more than 12 μm. If the alumina has too large an average particle size, disc rotor attack may not be low enough. On the other hand, if it has too small an average particle size, the effectiveness of the friction material may be compromised.

The alumina content, based on the overall friction material composition, is generally at least 0.5 vol %, and preferably at least 1 vol %, but generally not more than 2.5 vol %, and preferably not more than 2 vol %.

As noted above, it is preferable for both silicon carbide and alumina to be used in the invention. When both are used together, their combined amount, based on the overall friction material composition, is generally at least 2.5 vol %, and preferably at least 3 vol %, but generally not more than 4.5 vol %, and preferably not more than 4 vol %. Too large a combined amount of silicon carbide and alumina may increase disc rotor attack, whereas too small a combined amount may compromise the effectiveness of the friction material.

In the practice of the invention, the average particle size of the tin sulfide included in the friction modifier, while not subject to any particular limitation, is generally at least 5 μm, and preferably at least 7 μm, but generally not more than 30 μm, and preferably not more than 20 μm.

The tin sulfide content, based on the overall friction material composition, is generally at least 3.5 vol %, and preferably at least 4.5 vol %, but generally not more than 7.5 vol %, and preferably not more than 6.5 vol %. Too much tin sulfide may compromise the effectiveness of the friction material, whereas too little may result in increased disc rotor attack, disc pad wear and metal pickup.

To obtain a friction material having a low disc rotor attack and minimal disc pad wear, it is advantageous for the inorganic friction modifier in the invention to include graphite. When graphite is used, it has an average particle size of generally at least 150 μm, and preferably at least 200 μm, but generally not more than 350 μm, and preferably not more than 300 μm.

The graphite content, while not subject to any particular limitation, is generally at least 7 vol %, and preferably at least 9 vol %, but generally not more than 15 vol %, and preferably not more than 13 vol %, based on the overall friction material composition.

Illustrative examples of suitable organic friction modifiers include cashew dust, ground tire rubber, rubber dust (rubber powder or particles), nitrile rubber dust (unvulcanized product) and acrylic rubber dust (vulcanized product). Cashew dust and ground tire rubber are especially preferred. Any one or combination of two or more of these may be used.

The content of this organic friction modifier, while not subject to any particular limitation, is generally at least 10 vol %, and preferably at least 13 vol %, but generally not more than 22 vol %, and preferably not more than 19 vol %, based on the overall friction material composition.

No particular limitation is imposed on the method of manufacturing the friction material of the invention. For example, production may involve uniformly blending together the various above-described components in a suitable mixer such as a Henschel mixer, Loedige mixer or Eirich mixer to form a friction material composition. The composition is then typically preformed in a mold, following which the preform is molded at a temperature of 130 to 180° C. and a pressure of 20 to 50 MPa for a period of 5 to 15 minutes. The resulting molded article is typically post-cured by heat treatment at 140 to 250° C. for 2 to 48 hours, then painted, baked and surface-ground as needed.

When the inventive friction material is to be used as an automotive disc pad, production may be carried out by placing the preform obtained above on an iron or aluminum plate that has been pre-washed, surface-treated and coated with an adhesive, molding the preform in this state within a mold, and subsequently heat-treating, painting, baking and surface-grinding.

The friction material of the invention can be used in a broad range of applications, including brake-linings and disk pads for automobiles, large trucks, railroad cars and various types of industrial machinery.

The friction material of the invention undergoes an amount of strain that is linear with respect to the hydraulic line pressure, and thus provides a excellent brake feel. Moreover, the inventive friction materials have a torque developed in response to a pushing force at high speed and high temperature that is linear, and have a good effectiveness. Also, these friction materials minimize the attack of cast iron and cast steel disc rotors, disc pad wear and metal pickup, and have an excellent balance of all the above properties. Such qualities make the friction materials of the invention highly suitable for use as automotive friction materials, particularly disc pads.

EXAMPLES

Examples of the invention and comparative examples are given below by way of illustration and not by way of limitation.

Examples 1 to 5,

Comparative Examples 1 to 5

The various components were formulated as shown in Table 1 and uniformly blended in a Loedige mixer to give friction material compositions. These compositions were preformed in a pressure mold under a pressure of 30 MPa for a period of 30 seconds to give preforms. The preforms were molded at a molding temperature and pressure of 160° C. and 40 MPa for 10 minutes, then postcured by 5 hours of heat treatment at 200° C., yielding automotive brake pads in the respective examples.

The strain linearity, torque linearity, effectiveness, disc rotor attack, disc pad wear, and metal pickup of the resulting brake pads were evaluated as described below. The results are given in Table 1.

Strain Linearity

In order for the intentions of the driver to be accurately manifested as a braking force on the vehicle ("excellent brake feel"), the amount of elastic deformation by the friction material with respect to stress within the commonly used brake line pressure range of up to 3 MPa must be small and the coefficient of friction must have a linear relationship with the stress (the amount of stress must be linear).

The compressive strain by a brake pad at each increment of 0.3 MPa up to a load equivalent to 3 MPa was measured in accordance with JIS D4413, a linear function (approximation) was fitted to the data, and the resulting correlation coefficients R were compared. The strain linearity was rated as follows.

| | |
|---|---|
| Excellent (Exc): | $R^2 \geq 0.98$ |
| Good: | $0.98 > R^2 \geq 0.95$ |
| Fair: | $0.95 > R^2$ |

Torque Linearity

Friction materials used in automobiles and other vehicles, such as disc brake pads and brake linings, must undergo little fluctuation in the friction coefficient during braking when the opposing material such as a disc rotor or a brake drum is turning at high speed or is at a high temperature. This quality is referred to as torque linearity.

Sensory tests were carried out in an actual vehicle, and the torque linearity was rated as follows.

| | |
|---|---|
| Excellent (Exc): | When the brake pedal was depressed, the braking response was good and the brakes grabbed. |
| Good: | When the brake pedal was depressed, the braking response was good but braking effectiveness was flat. |
| Fair: | A braking forces was achieved, but additional braking was required. |

Effectiveness

A high speed braking test at the time of second effectiveness (stable period) following break-in was carried out in accordance with JASO C406 ("Braking Device Dynamometer Test Procedure—Passenger Car"), and the coefficient of friction μ at that time was measured. The test conditions were as follows.

| | |
|---|---|
| Caliper brake model: | PD48-11S (stainless steel) |
| Inertia: | 3.5 kgf · m · s² |
| Initial braking speed: | 100 km/h |
| Brake line pressure: | 80 kgf/cm |
| Breaking in: | consisting of 200 braking cycles at 65 km/h, 40 kgf/cm² and 120° C. |

The effectiveness was rated as follows based on the coefficient of friction μ.

| | |
|---|---|
| Excellent (Exc): | 0.43 ≤ μ < 0.46 |
| Good: | 0.41 ≤ μ < 0.43 |
| Fair: | 0.38 ≤ μ < 0.41 |

Disc Rotor Attack

Testing was carried out in accordance with JASO C427 (Wear Tests). The amount of disc rotor wear (μm) was measured under the following conditions: initial braking speed, 50 km/h; braking deceleration, 0.3 G; suitable number of braking cycles; brake temperature prior to braking, 100° C., 200° C., 300° C., 400° C. The measurements were converted to the amount of wear per 1,000 braking cycles, based on which disc rotor attack was rated as follows.

| | |
|---|---|
| Excellent (Exc): | amount of disc rotor wear was less than 15 μm |
| Good: | amount of disc rotor wear was at least 15 μm, but less than 20 μm |
| Fair: | amount of disc rotor wear was at least 20 μm, but less than 25 μm |
| Poor: | amount of disc rotor wear was 25 μm or more |

Disc Pad Wear

Testing was carried out in accordance with JASO C427 (Wear Tests). The amount of disc pad wear (mm) was measured under the following conditions: initial braking speed, 50 km/h; braking deceleration, 0.3 G; suitable number of braking cycles; brake temperature prior to braking, 100° C., 200° C., 300° C., 400° C. The measurements were converted to the amount of wear per 1,000 braking cycles, based on which disc pad wear was rated as follows.

| | |
|---|---|
| Excellent (Exc): | amount of disc pad wear was less than 0.15 mm |
| Good: | amount of disc pad wear was at least 0.15 mm, but less than 20 mm |

Metal Pickup

Metal pickup refers to the aggregation on the friction material surface of metal components from within the friction material, causing abnormal wear of the disc rotor. In the wear tests, metal pickup was examined during wear measurements at various temperatures, and was rated according to the following criteria.

| | |
|---|---|
| Excellent (Exc): | No metal pickup was observed |
| Good: | At most several small metal fragments up to 3 mm in diameter were picked up |
| Fair: | Numerous small metal fragments were picked up |

TABLE 1

| | Example | | | | | Comparative Example | | | | |
|---|---|---|---|---|---|---|---|---|---|---|
| | 1 | 2 | 3 | 4 | 5 | 1 | 2 | 3 | 4 | 5 |
| Composition (vol %) | | | | | | | | | | |
| Stainless steel fibers | 9.5 | 7.0 | 12.0 | 9.5 | 9.5 | — | 9.5 | 9.5 | 9.5 | 9.5 |
| Steel fibers | — | — | — | — | — | 9.5 | — | — | — | — |
| Aramid fibers | 3.0 | 3.0 | 3.0 | 3.0 | 3.0 | 3.0 | 3.0 | 3.0 | 3.0 | 3.0 |
| Bronze fibers | 5.5 | 5.5 | 5.5 | 5.5 | 5.5 | 5.5 | — | 5.5 | 5.5 | 5.5 |
| Copper fibers | — | — | — | — | — | — | 5.5 | — | — | — |
| Alumina | 1.5 | 1.5 | 1.5 | 1.0 | 2.0 | 1.5 | 1.5 | 1.5 | — | 3.5 |
| Silicon carbide | 2.0 | 2.0 | 2.0 | 2.0 | 2.0 | 2.0 | 2.0 | 2.0 | 3.5 | — |
| Artificial graphite | 11.0 | 11.0 | 11.0 | 11.0 | 11.0 | 11.0 | 11.0 | 11.0 | 11.0 | 11.0 |
| Vermiculite | 10.0 | 10.0 | 10.0 | 10.0 | 10.0 | 10.0 | 10.0 | 10.0 | 10.0 | 10.0 |
| Tin sulfide | 5.5 | 5.5 | 5.5 | 5.5 | 5.5 | 5.5 | 5.5 | 3.0 | 5.5 | 5.5 |
| Barium sulfate | 24.0 | 26.5 | 21.5 | 24.5 | 23.5 | 24.0 | 24.0 | 26.5 | 24.0 | 24.0 |
| Cashew dust | 6.0 | 6.0 | 6.0 | 6.0 | 6.0 | 6.0 | 6.0 | 6.0 | 6.0 | 6.0 |
| Ground tire rubber | 10.0 | 10.0 | 10.0 | 10.0 | 10.0 | 10.0 | 10.0 | 10.0 | 10.0 | 10.0 |
| Phenolic resin | 12.0 | 12.0 | 12.0 | 12.0 | 12.0 | 12.0 | 12.0 | 12.0 | 12.0 | 12.0 |
| Total | 100.0 | 100.0 | 100.0 | 100.0 | 100.0 | 100.0 | 100.0 | 100.0 | 100.0 | 100.0 |
| Evaluations | | | | | | | | | | |
| Strain linearity | Exc | Good | Exc | Exc | Exc | Fair | Exc | Exc | Exc | Exc |
| Torque linearity | Exc | Exc | Exc | Good | Exc | Fair | Good | Exc | Exc | Good |
| Effectiveness | Exc | Exc | Exc | Exc | Exc | Good | Fair | Exc | Good | Fair |

TABLE 1-continued

|  | Example | | | | | Comparative Example | | | | |
| --- | --- | --- | --- | --- | --- | --- | --- | --- | --- | --- |
|  | 1 | 2 | 3 | 4 | 5 | 1 | 2 | 3 | 4 | 5 |
| Disc rotor attack | Exc | Exc | Good | Exc | Good | Exc | Good | Fair | Poor | Good |
| Disc pad wear | Exc | Exc | Exc | Exc | Good | Exc | Exc | Good | Fair | Good |
| Metal pickup | Exc | Exc | Exc | Exc | Exc | Exc | Good | Fair | Good | Exc |

Stainless steel fibers: Average fiber diameter, 50 μm; average fiber length, 1 mm
Steel fibers: Average fiber diameter, 55 μm; average fiber length, 2 mm
Bronze powder: Spherical; average particle size, 80 μm
Copper powder: Milled powder; average particle size, 80 μm
Alumina: Milled powder; average particle size, 10 μm
Silicon carbide: Milled powder; average particle size, 4 μm
Artificial graphite: Milled powder; average particle size, 250 μm
Tin sulfide: Average particle size, 10 μm Japanese Patent Application No. 2003-190068 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A friction material made by molding and curing a composition comprising:
   a fibrous base;
   a friction modifier; and
   a binder, wherein
   the fibrous base includes stainless steel fibers but is free of other steel fibers
   the friction modifier includes at least two types of hard particles having a Mohs hardness of at least 9, bronze powder having an average particle size of 40 to 100 μm and 3.5 to 7.5 vol % of tin sulfide, based on the overall composition, and
   the binder includes at least one selected from the group consisting of phenolic resin, phenol aralkyl resin, high-ortho phenolic resin modified with acrylonitrile-butadiene rubber (NBR), NBR-modified phenolic resin, acrylic rubber-modified phenolic resin and aromatically modified phenolic resin.

2. The friction material of claim 1, which is free of copper fibers and copper powder.

3. The friction material of claim 1, wherein the hard particles having a Mohs hardness of at least 9 include silicon carbide and alumina.

4. The friction material of claim 1, wherein an amount of the bronze powder is 3.5 to 7.5 vol % based on the overall composition.

* * * * *